3,338,958
PROCESS FOR THE PREPARATION OF CYCLOHEXYLSULFAMATES
Noriyuki Okuda and Yoshio Fukuda, Tokyo, and Kikuji Suzuki, Funabashi, Chiba Prefecture, Japan, assignors to Daiichi Seiyaku Co., Ltd., Tokyo, Japan, a corporation of Japan
No Drawing. Filed Aug. 6, 1963, Ser. No. 300,184
Claims priority, application Japan, Aug. 14, 1962, 37/35,238
1 Claim. (Cl. 260—500)

The present invention relates to a process for the preparation of cyclohexylsulfamates and more particularly, it relates to a process for the preparation of cyclohexylsulfamates by reacting sulfamide with hydrous cyclohexylamine with heating under an increased pressure.

The principal object of the present invention is to obtain the desired cyclohexylsulfamates economically and commercially using impure sulfamide and hydrous cyclohexylamine.

Other objects, features and advantages will be apparent from the following illustrative and explanatory description of the invention.

It is known that cyclohexylsulfamates may be prepared in large quantities as a synthetic sweetening agent by reacting cyclohexylamine with sulfamates, imidosulfates or nitrilosulfates with heating under an atmospheric or increased pressure. Furthermore, processes for the preparation of triammonium cyclohexylsulfamates have heretofore been proposed, one of which comprises hydrolyzing N,N'-dicyclohexylsulfamide to give cyclohexylammonium cyclohexylsulfamate and other comprises hydrolyzing N-cyclohexylsulfamide to give ammonium cyclohexylsulfamate. That is, each process comprises preparing N,N'-dicyclohexylsulfamide or N-cyclohexylsulfamide from sulfamide and cyclohexylamine and hydrolyzing each of them to give ammonium cyclohexylsulfamate.

After intensive research and experiments in regard with the process for the preparation of cyclohexylsulfamates from sulfamide and cyclohexylamine, it has now been found that cyclohexylammonium cyclohexylsulfamate may be obtained in a good yield by heating sulfamide with hydrous cyclohexylamine under an increased pressure at 110–190° C., preferably at 140–170° C.

In practice of this reaction, the desired product is formed very slowly by heating the mixture of said reactants with reflux under an atmospheric pressure, but rapidly by heating the mixture at an elevated temperature and under an increased pressure.

The reaction seems to proceed according to the following equation:

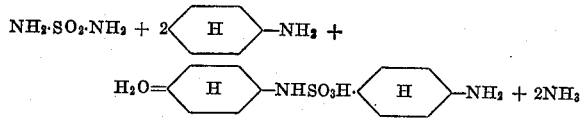

When anhydrous cyclohexylamine and sulfamide are heated at 170° C. to 200° C. under an increased pressure, cyclohexylammonium cyclohexylsulfamate is not formed, but only N,N'-dicyclohexylsulfamide is formed. When small quantities of water is present in the reaction medium, however, cyclohexylammonium cyclohexylsulfamate is obtained in a good yield. It is a new and interesting fact that cyclohexylammonium cyclohexylsulfamate can be obtained by heating sulfamide with hydrous cyclohexylamine under an increased pressure, the reaction mechanism being not yet clear at present.

As cyclohexylamine and water play an additional part as a solvent in the reaction system, they may be used in a suitable amount in a wide range. Cyclohexylamine may be preferably used in 1.5 to 2.5 times the calculated amount. On the other hand, water may be added preferably in an amount of about 10% of cyclohexylamine, while, when water is added in an amount of 20% or more of cyclohexylamine, the yield of the desired product may be reduced.

Inert solvent such as kerosine may be used partly in the place of cyclohexylamine.

Sulfamide used as starting material in the process of the present invention can be prepared by reacting $SO_2$, $Cl_2$ and $NH_3$ with each other in gaseous phase with formation of ammonium chloride and can be recovered by extraction with organic solvents such as acetone.

In carrying out this invention, the said reaction mixture, i.e., sulfamide with ammonium chloride, can be used as such. Thus, recovering pure sulfamide is not required. When sulfamide material containing ammonium chloride is used, ammonium chloride reacts with cyclohexylamine to give cyclohexylamine hydrochloride with splitting ammonia. As cyclohexylamine hydrochloride is very soluble in water and cyclohexylammonium cyclohexylsulfamate is slightly soluble in water, both can easily be separated from each other. Cyclohexylamine can be recovered easily from said cyclohexylamine hydrochloride. Accordingly, when the mixture of sulfamide and ammonium chloride is used as a starting material in the process of the present invention, cyclohexylammonium cyclohexylsulfamate can be produced, without any hindrance, by excessive addition of cyclohexylamine, this fact being an advantage of the present invention in industrial operation. In addition, it is another advantage of the present invention that the recovered cyclohexylamine containing water can be reused as such, whereas anhydrous cyclohexylamine is required for reuse in the known methods.

The cyclohexylammonium cyclohexylsulfamate obtained by the process of the present invention can be converted into the other salts such as sodium and calcium salt by reacting it with corresponding metal hydroxides, for example, sodium and calcium hydroxide. In the process of the present invention, however, the conversion may be accomplished by removing excess cyclohexylamine and adding to the residue, for example, a sodium hydroxide solution and then concentrating the mixture. Thus, isolation of cyclohexylammonium cyclohexylsulfamate is not an essential operation.

If a calcium hydroxide slurry is used instead of the said sodium hydroxide solution, calcium cyclohexylsulfamate may be obtained in the same manner as that described above.

As described above, the process of the present invention is advantageous from the industrial point of view in that cyclohexylsulfamates are obtained with a good yield from cheap starting materials by the simple operation.

The invention is further disclosed in the following examples which are illustrative but not limitative thereof.

*Example 1*

19.2 parts of sulfamide, 99 parts of cyclohexylamine and 10 parts of water are placed in an autoclave and the mixture is heated at 170° C. for 4 hours. After cooling upon standing, the excess of cyclohexylamine is recovered under reduced pressure to give crystalline mass which is recrystallized from hot water to yield 47 parts of cyclohexylammonium cyclohexylsulfamate as white needles having M.P. 192–195° C. The yield was 84%.

The product thus obtained is reacted with 80 parts of 10% sodium hydroxide solution and concentrated to give crude crystals of sodium cyclohexylsulfamate which is recrystallized from hot water to obtain 33 parts of the pure salt.

*Example 2*

9.6 parts of sulfamide, 10.7 parts of ammonium chloride, 59 parts of cyclohexylamine and 5 parts of water are placed in an autoclave and heated at 170° C. for 4 hours. After cooling upon standing, excessive cyclohexylamine is recovered from the reaction mixture. The residue is recrystallized from hot water to give 23 parts of cyclohexylammonium cyclohexylsulfamate as white needles having M.P. 192–195° C. Yield: 85%.

The product thus obtained is reacted with 40 parts of 10% sodium hydroxide solution and treated in the same manner as in Example 1 to give 16 parts of sodium cyclohexylsulfamate in pure crystalline form.

The filtrate obtained by separation of cyclohexylammonium cyclohexylsulfamate contains cyclohexylamine hydrochloride, so that the filtrate is added with 10 parts of sodium hydroxide and distilled to recover an aqueous solution containing 18 parts of cyclohexylamine.

What we claim is:

A process for the preparation of a metal salt of cyclohexylsulfamic acid selected from the group consisting of sodium cyclohexylsulfamate and calcium cyclohexylsulfamate which comprises reacting sulfamide with cyclohexylamine, said cyclohexylamine containing water in a quantity of 10 to 20% by weight thereof and the molecular ratio of sulfamide to cyclohexylamine being 1:3 to 1:5 at a temperature between about 110 and 190° C. to produce cyclohexylammonium cyclohexylsulfamate and decomposing the resulting cyclohexylammonium cyclohexylfulfamate with a metal hydroxide selected from the group consisting of sodium hydroxide and calcium hydroxide to produce the corresponding salt of cyclohexylsulfamic acid.

References Cited

UNITED STATES PATENTS 2,804,477  8/1957  McQuard _____ 260—500

FOREIGN PATENTS 662,800  12/1951  Great Britain.
24,076  12/1961  Japan.

OTHER REFERENCES

Audrieth et al.: "Chem. Reviews," vol. 26 (1940), pp. 49 to 54, 77 and 78.

Paquin: "Angen. Chem.," vol. 60 (1958), pp. 316 to 320.

LEON ZITVER, *Primary Examiner.*

BERNARD HELFIN, *Examiner.*

J. E. EVANS, *Assistant Examiner.*